United States Patent [19]

Clark

[11] 4,125,027

[45] Nov. 14, 1978

[54] GAUGE FOR REMOTELY INDICATING THE PRESSURE OF A SUBTERRANEAN FORMATION

[75] Inventor: Kenneth K. Clark, Tulsa, Okla.

[73] Assignee: Geophysical Research Corporation, Tulsa, Okla.

[21] Appl. No.: 848,613

[22] Filed: Nov. 4, 1977

[51] Int. Cl.² .............................................. G01L 9/12
[52] U.S. Cl. ...................................................... 73/724
[58] Field of Search ................. 73/724, 718, 745, 756, 73/88 E; 361/283

[56] References Cited

U.S. PATENT DOCUMENTS

| 3,859,575 | 1/1975 | Lee et al. | 73/724 |
| 3,968,694 | 7/1976 | Clark | 73/724 |

Primary Examiner—Donald O. Woodiel
Attorney, Agent, or Firm—Head, Johnson & Chafin

[57] ABSTRACT

An apparatus particularly adaptable for recording pressure of subterranean formations in a downhole pressure gauge by providing a variable capacitance in response to changes in ambient pressure. The apparatus comprising a closed tubular housing having a deformable conductive end with an interior and exterior surface, the deformable end forming a diaphragm subject to the pressure in which the housing is positioned, increased pressure deflecting the deformable end inwardly. The deformable end has an axial boss portion extending inwardly from the inner surface. A stator having a central hub is positioned within the housing, the hub having an opening therein which receives the boss portion. The stator has a planar portion positioned adjacent to and spaced from the interior surface of the housing deformable end, the portion of the planar surface of the stator adjacent the housing deformable and interior surface being of conductive material forming a capacitive relationship between the housing deformable end so that when the deformable end is concaved inwardly by increased ambient pressure of the fluid environment in which the apparatus is positioned, the capacitive relationship between the stator and the deformable end changes to provide an indication of the amount of ambient pressure applied to the exterior of the housing.

6 Claims, 4 Drawing Figures

GAUGE FOR REMOTELY INDICATING THE PRESSURE OF A SUBTERRANEAN FORMATION

BACKGROUND AND OBJECTS OF THE INVENTION

This invention is directed towards an apparatus for providing variable capacitance effect in response to changes in ambient pressure and more particularly, to a gauge for remotely indicating the pressure of a subterranean formation. A gauge of the type to which this invention is particularly directed is described in detail in U.S. Pat. No. 3,968,694, issued July 13, 1976, entitled "GAUGE FOR REMOTELY INDICATING THE PRESSURE OF A SUBTERRANEAN FORMATION". U.S. Pat. No. 3,968,694 is incorporated herein by reference. This patent teaches a gauge including a housing having a deformable end which is deflected by changes in ambient pressure in which the housing is positioned. The patent described an arrangement for positioning a stator adjacent to the deformable end to provide a capacitance relationship and in an arrangement wherein the changes in capacitance between the stator and the deformable housing may be utilized to indicate the pressure to which the housing is subjected.

The present invention is directed toward an alternate design of the stator and deformable end portion of the gauge described in U.S. Pat. No. 3,968,694.

It is therefore an object of this invention to provide an apparatus producing a variable capacitance effect in response to changes in ambient pressure.

Still more particularly, an object of this invention is to provide an improved and simplified stator for use in a gauge having a deflectable surface for producing a changing capacitance effect in response to changing ambient pressure to which the gauge is subjected.

These objects, as well as other and more particular objects of the invention will be fulfilled in the following description and claims, taken in conjunction with the attached drawings.

DESCRIPTION OF VIEWS

SUMMARY OF THE INVENTION

An apparatus provided for producing a variable capacitance effect in response to changes in ambient pressure and particularly, the invention is useful in constructing gauges for positioning in oil and gas wells to provide an indication of the pressure in a well. The apparatus or gauge includes a tubular housing having a deformable conductive end with an interior and exterior surface. The exterior surface of the deformable housing end is subjected to the ambient pressure in which the apparatus is positioned. The housing end is configured of such thickness so that it will deflect inwardly in response to increased ambient pressure of the medium in which the apparatus is placed. The deformable end has an integral inwardly extending axial boss portion. Within the housing is a stator element having a hub portion with an axial opening therethrough, the opening receiving the deformable end boss so that means is provided for supporting the stator relative to the deflactable end interior surface. The stator further includes an integral planar portion extending radially outwardly from the hub portion and extending generally parallel the interior surface of the deformable end. A part of the surface of the stator member adjacent the interior surface of the deformable end is of conductive material so that a capacitive relationship is provided between the stator planar element and the interior surface of the housing deformable end. By means of circuit elements within the housing, the capacitive relationship between the stator and the deformable end is detected to provide a signal responsive to this capacitive relationship, the signal being thereby indicative of the amount of the ambient pressure to which the housing is subjected.

DETAILED DESCRIPTION OF THE PREFERRED EMBODIMENT

Figure 1:
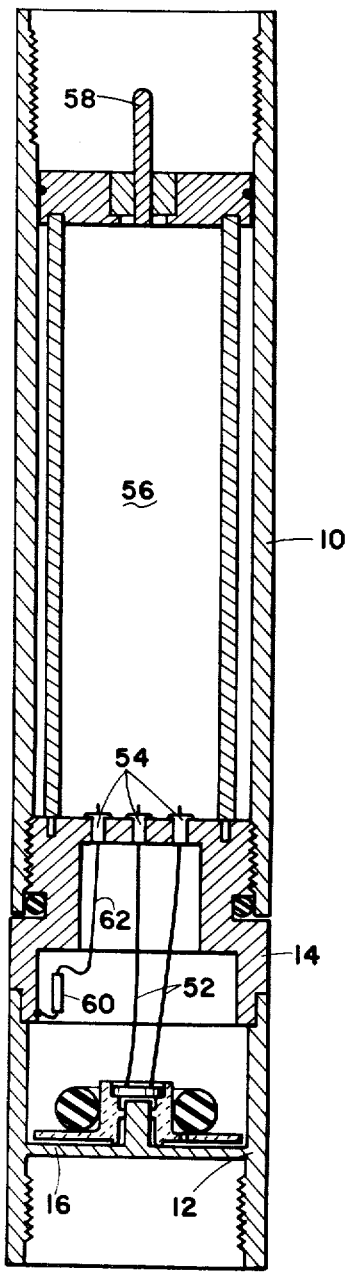
FIG. 1 is a cross-sectional view of a bottom hole pressure gauge embodying the principles of this invention.
Figure 4:
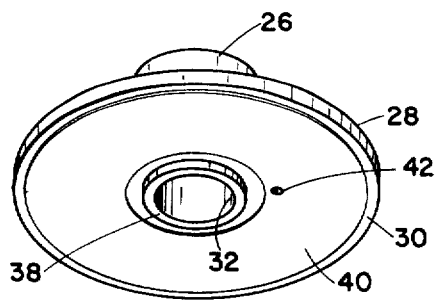
FIG. 4 is an isometric view of the stator as employed in the apparatus of this invention.

Referring to the drawing, and first to FIG. 1, a cross-sectional view of an instrument which is suitable for positioning in an oil or gas well for measuring the pressure within the well is disclosed. The apparatus includes a tubular housing 10 having a tubular lower portion 12. Between the housing 10 and lower portion 12 is an isolation plug 14 which serves to isolate the interior of the housing lower portion from the ambient pressure surrounding the gauge. The actual construction of the housing 10, lower portion 12, and isolation plug 14 may vary in many respects.

Figure 2:
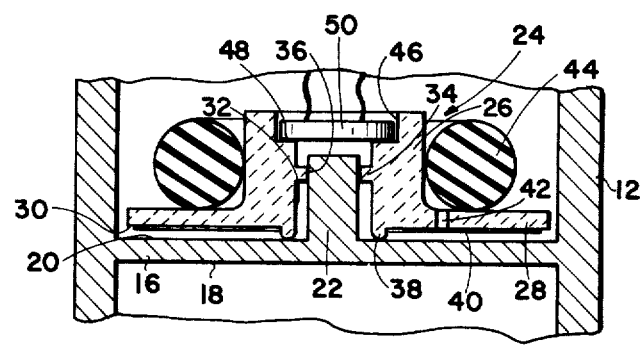
FIG. 2 is an enlarged partial cross-sectional view of the gauge of FIG. 1 showing the stator in relationship to the deformable housing end by which a capacitance effect is achieved, the capacitance varying in response to changing ambient pressures in which the gauge is positioned.

The housing lower portion 12 includes a closed end 16 having as best seen in FIG. 2, an outer surface 18 and an inner surface 20. The closed end 16 is of a preselected thickness, according to the diameter of the lower portion 12 and the pressure ranges to which the gauge is designed, such that the end 16 is deformed or deflected by the ambient pressure to which the gauge is subjected. The higher the ambient pressure, the more the deformable end 16 is deflected inwardly.

Integrally formed with the deformable end 16 and extending axially inwardly from the interior surface 20 is an integral boss member 22.

Positioned within the interior of housing lower portion 12 is a stator member generally indicated by the numeral 24. The essence of this invention is the stator member 24 and its relation to the deformable end 16 having an integral boss 22. Stator 24 includes a central hub portion 26 and integral radially extending planar portion 28. The planar portion 28 has a lower surface 30 which is adjacent to and spaced slightly from the deformable end interior surface 20. The hub portion 26 includes an opening 32 which receives the boss 22. In the preferred and illustrated arrangement, opening 32 includes an inwardly extending reduced internal diameter lip 34 having an opening 36 therein which receives the boss portion 22. Stator 24 may be retained in position on boss 22 by bonding cement applied at lip 34.

The stator 24 is further defined by an integral lip 38 adjacent the opening 32 and extending downwardly from the surface 30 of the stator planar portion 28. Lip 38 engages the interior surface 20 of deformable end 16 and functions to accurately space the stator surface 30 from the deformable end interior surface 20.

In the preferred embodiment stator 24 is of ceramic material. Formed on the stator planar surface 30 is a layer of conductive material 40. The housing 12 and integral deformable end 16 is of conductive material so that a capacitive relationship is provided between the interior surface 20 of the deformable end and the conductive material 40 placed on the stator planar portion 28.

A small diameter opening 42 is formed in the stator planar portion 28 to provide a passageway for a conductor connecting with the conductive material 40, a conductor not being shown.

Supported adjacent the upper surface of the stator planar portion 28 and around the outer periphery of the stator hub 26 is an inductor in the form of a toroid 44. The opening 32 in hub 26 is further defined at the upper end by an enlarged internal diameter recess 46 providing a ledge 48. Positioned in the opening 46 and supported on ledge 48 is a hybrid circuit 50 including transistors, diodes, and so forth, necessary to provide the components of an oscillation circuit which includes the capacitor formed between conductive material 40 on the stator and the upper surface 20 of the deformable housing end 16 and the inductive toroid 44.

As shown in FIG. 1, conductors 52 extend from the hybrid circuit 50 through feed-through connectors 54 into the interior 56 of the upper housng where further signalling processing circuitry (not shown) may be located. The output of the processing circuitry may be fed to a cable connector 58 by which a signal may be transmitted to the earth's surface using known techniques. The signal processing circuitry may include a temperature sensor 60 and conductor 62 feeding into the signal processing circuitry.

Figure 3:
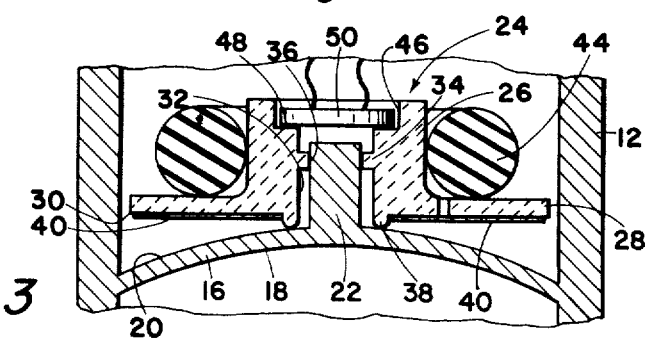
FIG. 3 shows the partial cross-sectional view as in FIG. 2, but showing the deformable end of the housing deflected inwardly in an exaggerated display of the effect of high ambient pressure to which the gauge is subjected showing how the capacitive relationship between the stator and the deformable end of the gauge housing is achieved.

FIG. 3 compared to FIG. 2 illustrates the manner in which the apparatus functions to provide a variable capacitance effect in response to changes in ambient pressure. FIG. 2 illustrates the arrangement wherein the apparatus is subjected to atmospheric pressure, that is, wherein there is insufficient ambient pressure to deflect the diaphragm 16 from its normal position. FIG. 3 shows the diaphragm 16 deflected inwardly as would be a consequence of high ambient pressure such as occurs in the bottom of oil and gas wells. The high ambient pressure from the exterior of housing lower portion 12 causes the deformable ends of the housing 16 to bulge inwardly, the amount of the inward displacement being greatly exaggerated in FIG. 3 to illustrate the principle of the invention. The inward concave displacement of the deformable end 16 moves the boss portion 22 inwardly to which the stator 24 is connected. Since the stator is isolated from the ambient pressure, it is not deformed, and the planar portion 28 remains in its initial configuration. This causes an increased separation between the conductive material 40 attached to the bottom surface of the stator planar portion 28 and the upper surface 20 of the deformable end 16, thereby reducing the capacitive relationship between these two components. This reduction in capacitance is reflected by the signal generated by the circuitry within the apparatus, including the inductor 44. This signal is processed and transmitted to the earth's surface to provide an indication of the ambient pressure in which the gauge is subjected.

As a comparison with the gauge described in U.S. Pat. No. 3,968,694 to which reference has been previously made, increased ambient pressure increases the capacitive relationship in the gauge of the patent whereas in this invention increased ambient pressure decreases the capacitive relationship.

The gauge herein described has advantages over known types of gauges intended for measurement of subterranean formation pressures in that it is particularly adaptable for temperature compensation design. By proper location and dimensioning of lip 38 and the height of internal boss 34 above the lip, combined with proper selection of materials for lower housing 12 (preferably metal) and stator 24 (preferably ceramic) the gauge may be engineered to greatly reduce the effect of temperature changes. Another advantage of the design of this invention is that it provides a favorable location for hybrid circuit 50. Circuit 50 is used to provide buffering between the capacitance (parts 16 and 40) and inductance (part 44) components and other circuit elements, such as conductors 52. With proper buffering, change in capacitance between conductors 52 does not effect the frequency produced by the oscillatory circuits. These engineering advantages provide a gauge which more faithfully responds to changes in pressure rather than extraneous effects.

While the invention has been described with a certain degree of particularly, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. Apparatus for providing a variable capacitance effect in response to changes in ambient pressure, comprising:
 a housing having a deformable portion having an interior and an exterior surface, the deformable portion forming a diaphragm, the exterior surface of which is subject to ambient pressure, said portion having a boss extending from its inner surface;
 a stator having a central hub having an opening therein receiving said boss portion, and the stator having a planar portion positioned adjacent to and spaced from said interior surface of said housing deformable portion, the stator having a lip adjacent said opening, the lip extending from said planar portion and having engagement with said housing deformable portion interior surface, the lip serving to accurately position said stator relative to said housing deformable end, at least part of the surface of said stator planar portion adjacent said housing end interior surface being of conductive material forming a capacitance relationship with said housing deformable end.

2. An apparatus according to claim 1 wherein said hub has a recess in the end thereof opposite said planar portion, and including circuit components received in said recess.

3. Apparatus according to claim 1 wherein said stator element is formed of ceramic material having conductive material thereon forming said capacitive relationship with said housing deformable portion.

4. Apparatus according to claim 1 wherein said stator hub opening has an internal reduced diameter lip therein, the reduced diameter lip receiving and engaging said boss portion.

5. Apparatus according to claim 4 in which said stator internal lip portion is bonded to said boss portion providing means of retaining said stator in position adjacent said interior surface of said housing deformable end.

6. Apparatus according to claim 1 including an inductive toroid element received on said stator hub portion.

* * * * *